3,641,079
PROCESS FOR THE MANUFACTURE OF
TITANIC ESTERS
Eric Termin, Niederkassel, and Roshdy Ismail, Spich,
Germany, assignors to Dynamit Nobel AG, Troisdorf,
Germany
Filed Mar. 25, 1969, Ser. No. 810,269
Claims priority, application Germany, Mar. 28, 1968,
P 17 68 066.9
Int. Cl. C07f 7/28
U.S. Cl. 260—429.5                                 16 Claims

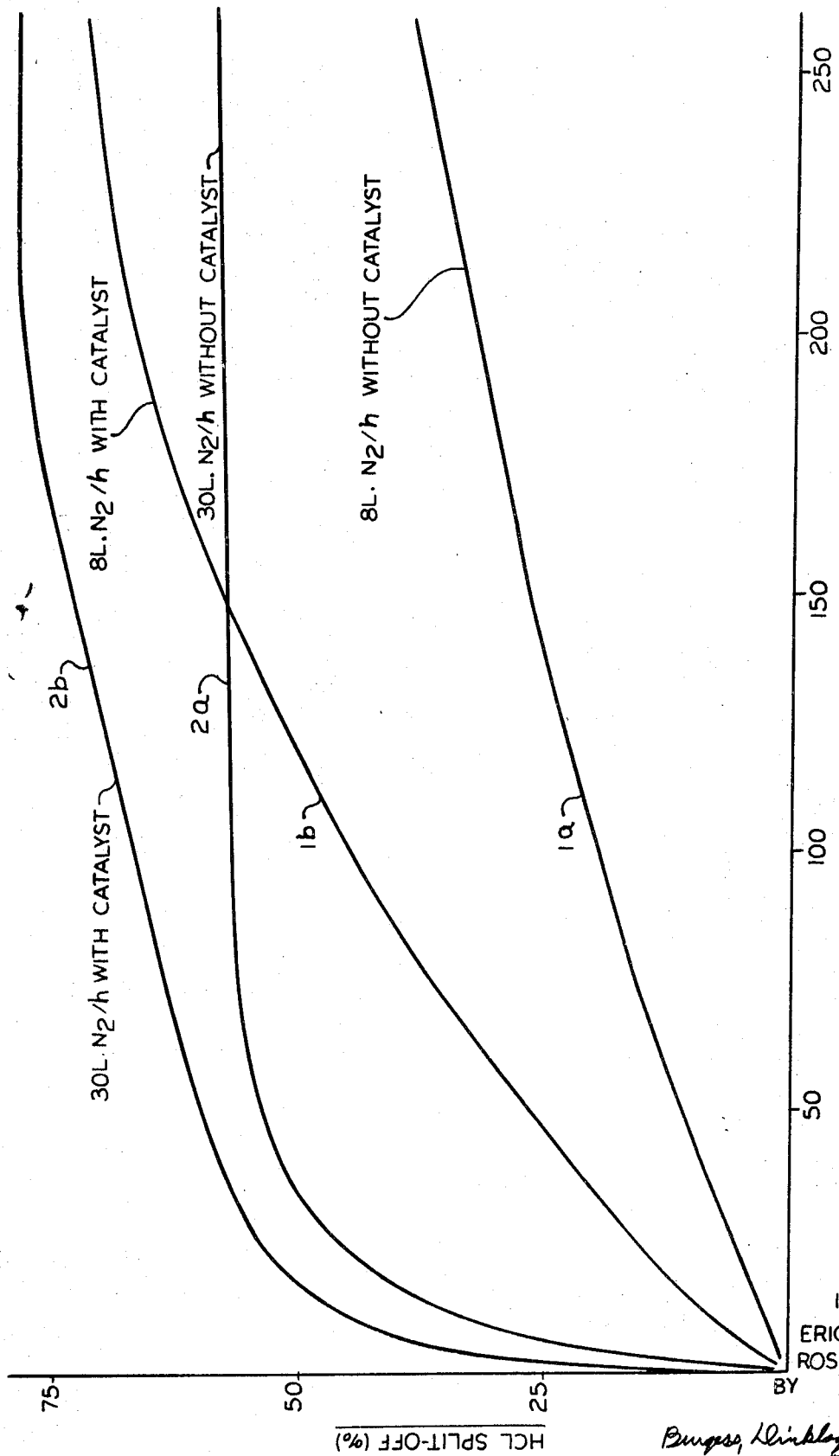

ABSTRACT OF THE DISCLOSURE

Manufacture of titanic esters from titanic halides and unsubstituted or aryl-substituted aliphatic hydroxy compounds, cycloaliphatic hydroxy compounds, or unsubstituted or alkyl-substituted aromatic hydroxy compounds performed in the presence of catalytic quantities of tertiary amines, whose amino group may or may not be a component of an aromatic ring system, and/or in the presence of unsubstituted or N-monosubstituted or N-disubstituted acid amides, with the use of solvents if desired, at temperatures of 50 to 250° C., preferably 50 to 200° C.

---

This invention relates to the production of titanium acid esters. It more particularly refers to a novel method of preparing titanium acid esters.

It is known that trihalogen monoalkoxy titanic esters as well as dihalogen dialkoxy titanic esters can be prepared by the direct reaction of titanium tetrahalides and alcohols in solvents with the attendant release of hydrogen chloride. In the preparation of monohalogen trialkoxy titanic esters and tetraalkoxy titanic esters, the completion of the reaction requires the use of a neutralizing agent in stoichiometric quantities to bind the residual generated halogen hydride. Alkalinely reacting substances are generally used for this purpose, mainly ammonia and its derivatives, and alkali alcoholates and alkaline earth metal alcoholates.

The disadvantages of this process are the following:

(1) The use of relatively large quantities of ammonia or alkali alcoholates.
(2) The salts which occur in large quantities after the reaction have to be filtered out or otherwise removed, which generally takes a rather long time.
(3) Relatively large amounts of solvents have to be used to keep the precipitated salt crystals filterable and for rewashing the filter cake.

It now has been found that these disadvantages can be greatly reduced by conducting the process for the manufacture of titanate esters in such a manner, according to the invention, that the titanium halides react with the unsubstituted or aryl-substituted aliphatic hydroxy compounds, cycloaliphatic hydroxy compounds, or the unsubstituted or alkyl-substituted aromatic hydroxy compounds in the presence of catalytic amounts of tertiary amines whose amino group may or may not be a component of an aromatic ring system, and/or in the presence of unsubstituted, N-monosubstituted or N-disubstituted acid amides, with the use of inert solvents, if desired, at temperatures of 20 to 250° C., preferably 50 to 200° C. It is surprising that the titanium halides and their derivatives react with unsubstituted or aryl-substituted aliphatic hydroxy compounds, cycloaliphatic hydroxy compounds, or unsubstituted or alkyl-substituted aromatic hydroxy compounds with the release of HCl even in the presence of catalytic quantities of the named nitrogen-containing compounds. Even the quaternary ammonium compounds that can be derived from the tertiary amines and the unsubstituted, N-monosubstituted or N-disubstituted acid amides catalyze the reaction in the same manner as the latter The quaternary ammonium and amide hydrochlorides and acetates are preferred.

In the replacement of halogen of titanium halides by an alkoxy group by direct methods, i.e., without the use of neutralizing agents, it is possible to replace no more than about 2 halogen atoms. According to the invention, it is now possible, with the aid of the catalysts described, to increase considerably the number of replaced halogen atoms, and it has been possible to substitute at least up to about 80% of the halogen, and in some cases even more than 99%.

In particular, we have succeeded in this manner in preparing the monohalogen trialkoxy esters and monohalogen triaryloxy titanic esters, whose manufacture by prior art techniques, e.g., by disproportioning the titanium tetrahalides with titanium tetraalkoxides, does not result in pure products, inasmuch as the disporportionation does not run entirely in the desired direction. In the preparation of tetratitanic esters, in addition to the saving of a portion of the neutralizing agent, the reaction process is accelerated, since the disadvantages described under (2) and (3) above are reduced.

The reaction according to the above invention is preferably performed at normal pressure. The method, however, can also be applied at overpressures of up to 25 atmospheres. Mixed and unmixed tertiary amines and acid amides having aliphatic, cycloaliphatic, aromatic and heterocyclic substituent radicals and mixtures thereof are suitable as catalysts for the performance of the process according to the invention, imides being considered as a type of cyclic amide in the meaning of the present invention.

Suitable tertiary amines whose amino group is not a component of an aromatic ring system and which have aliphatic substituent radicals are, for example: trimethylamine, triethylamine, triisopropylamine, triallylamine, triisobutylamine, monoethyldiisopropylamine, monoethyldi-n-butylamine, tri-n-butylamine, N,N,N',N'-tetramethylbutanediamine - (1,4), N,N,N',N' - tetramethylethylenediamine, substituted or unsubstituted tertiary aliphatic amines, such as β-chloropropyldipropyldiamine, tris-(β-ethoxyethyl)-amine, N,N-dimethylaminoacetonitrile, N-methylaminoacetonitrile, methyleneaminoacetonitrile, N,N-di-n-butylaminoacetonitrile, N,N - diisobutylaminopropionitrile, N,N-diisoprylaminoacetonitrile, N-n-butyl-N-methylaminoacetonitrile, N,N-dimethyl-β-aminopropionitrile, dimethyl-p-aminobenzonitrile, and the like. N,N-dimethylcyclohexylamine would be an example of amines having cycloaliphatic radicals. Suitable amines with aromatic substituent radicals are, for example, N,N-dialkyl-anilines (N,N-dimethylaniline and N,N-diethylaniline etc.), p-bromophenyldimethylamine, 2,4-dinitrophenyldimethylamine and benzyldimethylamine, p-nitrophenyl-di-n-butylamine, 2,4-dichlorophenyldiethylamine, N,N,N',N'-tetramethylbenzidine. Suitable heterocyclic nitrogen compounds are, for example: N-alkyl- and N-aryl-morpholines such as N-n-butylmorpholine, N-phenylmorpholine, N-(4-methylphenyl)-morpholine, morpholine acetic acid morpholide, N,N-dialkyl- or N,N-diarylpiperazines, such as N,N-dimethylpiperazine, N,N-di-n-butylpiperazine, N,N-diphenylpiperazine, N-substituted piperazine derivatives, N-aryl and N-alkyl tetrahydroquinolines or tetrahydroisoquinolines, such as N-n-propyltetrahydroquinoline, N-phenyltetrahydroisoquinoline, N-alkyl and N-aryl pyrrolidines and their derivatives such as N-methylpyrrolidine and substituted or unsubstituted derivatives of the aforenamed compounds.

Suitable tertiary amines whose amino group is a component of an aromatic ring system are aromatic tertiary amines such as pyridine, quinoline, isoquinoline, pyrazine, oxazine, quinazoline, oxazole, thiazole, oxadiazole, benzothiazole, and the like.

Suitable acid amides which are likewise N-monosubstituted or N-disubstituted are the carboxylic acid amides of monobasic aliphatic, aromatic and araliphatic carboxylic acids having 1 to 18 carbon atoms, such as formic acid, acetic acid, propionic acid, butyric acid, caproic acid, 2-ethylhexanic acid, caprylic acid, lauric acid, palmitic acid, stearic acid, benzoic acid, phenylacetic acid and phenylbutyric acid, which can be straight-chained or branched, or can have their alkyl chain interrupted by a keto group, as in the case of pyroracemic acid, acetoacetic acid or levulinic acid. Ammonia and monoamines or diamines are suitable as bases for reaction with the acid to produce the amides involved. Primary or secondary monoamines or diamines are preferred which are derived from the saturated aliphatic, araliphatic, or cycloaliphatic series or from the aromatic series with only one aromatic ring.

Examples of the amines are methylmaine, dimethylamine, di-n-propylamine and di-o-propylamine, di-n-butylamine and diisobutylamine, di-2-methylhexylamine, dilaurylamine, ethylenedimaine, tetramethylenediamine, hexamethylenediamine, cyclohexylamine, dicyclohexylamine, benzylamine, dibenzylamine, aniline, N-methylaniline, toluidine, phenylenediamine, and hexahydrophenylenediamine. One or both of the alkyl groups of the amines can be replaced or substituted by the phenyl or toluyl radical or by cycloalkyl groups having 5 to 6 cyclic carbon atoms, which may also be substituted by alkyl groups, especially one or two methyl groups. Among the diamines that are particularly well suited for the preparation of the acid amines are especially those in which the two amino groups are separated by 1 to 8 methylene groups. In the diamines, too, all but at least one of the hydrogen atoms still bound to the nitrogen atom can be substituted, for example, by alkyl groups having 1 to 4 carbon atoms, by the phenyl or toluyl radical, or a cycloalkyl radical having 5 to 6 members. The following can be named as representatives of particularly well-suited carboxylic acid amides which can be used as catalysts according to the invention: formamide, methylformamide, dimethylformamide, diethylformamide, acetamide, N,N-dimethylacetamide, N,N-di-n- or N,N-di-i-propylbutyramide, N,N-di-n- or N,N-di-isobutylbutyramide, N-benzylbutric acid amide, N,N-dipropyl-2-ethylhexanic acid amide, acetoacetic acid N,N-di-n-butylamide, acetoacetic acid anilide, benzoic acid benzylamide, N,N-dimethylbenzoic acid amide, and N,N'-diformylhexamethylenediamine. Cyclic acid amides or imidies, such as N,N-dimethylsuccinimide and N,N-diemthylmaleic acid imide, can also be used. Also usable as catalysts are barbituric acids, which can be substituted by hydrocarbon radicals, especially by $C_1$ to $C_4$ allkyl or phenyl groups, such as dimethylbarbituric acid, diethylbarbituric acid, di-i-propylbarbituric acid, diallylbarbituric acid, di-n-butylbarbituric acid and phenylethylbarbituric acid.

However, carbonic acid amides or imides can also be used, preferably the N-substituted derivatives, such as N-phenylurethane, diphenylcarbodiimide, and diphenylguanidine.

It is not necessary to use the prepared amides directly as catalysts. Instead, it is possible to use the components of which they are made up, e.g., a mixture of a primary or secondary monoamine or diamine of the above-named kind and one of the monocarboxylic acids mentioned, or the acid chlorides or anhydrides derived from these acids, which then form the acid amides under the conditions of the reaction.

Sulfonamides are also suitable catalysts, such as 4-sulfamoylacetaniline, N-amidinosulfanilamide, and N-2-pyridylsulfanilamide. Phosphoric and phosphorus acid amides can also be used as catalysts, such as N,N,N',N'',N''-hexamethylphosphoric acid triamide, N,N,N',N',N'',N''-hexamethylphosphorous acid triamide, N,N,N',N',N'',N''-hexamethylphosphorous acid triamide, N,N,N',N',N'',N''-hexa-n- or -isobutylphosphorous acetic acid triamide, and phosphorous acid trimorpholide. However, the phosphoric acid triamides are somewhat inferior to phosphorous acid in their catalytic action.

Titanic acid amides and stannic acid amides, such as di-n-propoxytitanium diamide and di-n- or -isobutyl tin diamide, can also be used as catalysts.

Pyridine, which fundamentally has a very good catalytic action, sublimates at high reaction temperatures in the form of the resultant pyridine hydrochloride. Consequently, the catalytic action diminishes during the reaction. It is desirable, therefore, to use pyridine in combination with other suitable amines or amides, or else to elevate the pressure during the reaction.

The described tertiary amines as well as the unsubstituted or N-mono- or N-disubstituted acid amides can, of course, also be used according to the invention in the form of their quaternary ammonium compounds in the same molar percentages.

The hydrochlorides and acetates have proven to be particularly suitable. Appropriate compounds are trimethylbenzylammonium chloride, triethylbenzylammonium hydroxide or acetate, and triethylammonium chloride, and the like.

Particularly preferred types of catalysts are those containing nitrile groups, those containing nitro groups where the nitro group is bonded to aromatics, and N,N-dialkyl-substituted acid amides.

The tertiary amines and acid amides used as catalysts are used in quantities of 0.01 to 20 mole percent, preferably 0.2 to 2 mole percent, with reference to the titanium halide. They can be added to the charges all at once or in a number of small portions.

Under the conditions according to the invention, the condensation reaction takes place rapidly with the release of gaseous hydrogen halide, preferably HCl. The annexed drawing clearly shows this advantage. The drawing represents the HCl yield versus time for charges consisting of 19.0 g. of $TiCl_4$ and 37.0 g. of n-butanol in 250 ml. of xylene. 2 mole percent (=0.15 g.) of dimethylformamide was used as the catalyst. The measurements were performed at different rates of flow of a dry inert gas (nitrogen) that was introduced.

The starting materials can be titanium tetrahalides or titanic ester halides of the general formula

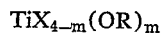

$$TiX_{4-m}(OR)_m$$

wherein X can be fluorine, chlorine, bromine or iodine, and R can be alkyl, cycloalkyl or aryl radicals which may contain ester groups if desired, and $m$ can be a whole number or fraction between 0 and 2. Examples of suitable titanium halides are titanium tetrachloride, titanium tetrabromide, titanium trichloro-n-butylester, titanium dichloro-di-n-butylester, and the like.

The hydroxy compounds can be monovalent or polyvalent unsubstituted or aryl-substituted aliphatic and cycloaliphatic alcohols or unsubstituted or alkyl-substituted phenols, which may contain ether groupings or ester groupings. The alcohols can be primary, secondary or even tertiary alcohols, and they may be branched or unbranched. Suitable alcohols are, for example, methanol, ethanol, n- and i-propanol, allyl alcohol, n-, i- and t-butanol, n-hexanol, 2-ethylhexanol, benzyl alcohol, cinnamic alcohol, cyclopentanol, cyclohexanol, cyclododecanol, ethylene glycol, diethylene glycol, butanediol-(1,4), hexanediol-(1,6), ethylene glycol monomethyl ether, diethylene glycol monomethyl ether, triethylene glycol mono-n-butyl ether, lactic acid alkyl ester, ethylene glycol monopropionic acid ester, and the like. Chlorinated alcohols can also be used according to the invention, examples being 2-chloropropanol, 2,3-dichloropropanol, 2,3-dibromopropanol, etc. The alcohols can also be compounds that have a tendency toward enolization and then behave chemically like alcohols, as, for example, acetyl acetone, levulinic acid ester, etc. The above exemplary enumeration shows that both saturated and unsaturated alcohols are suitable. Phenols are preferably monocyclic, for example, phenol and the isomeric cresols.

The reaction can be performed in the liquid phase both in the fused state and through the use of inert reaction media. The inert reaction media are liquid materials which are inert with respect to the reactants and the reaction products under reaction conditions which also function either as a true solvent or as a dispersing agent. Suitable inert solvents within the meaning of the present invention are both aliphatic and aromatic hydrocarbons and simple and cyclic ethers. Examples of aliphatic hydrocarbons are both homogeneous compounds and mixtures, such as isooctane and benzine fractions, as, for example, those having a boiling range of 120 to 200° C. Cycloaliphatic compounds like decahydronaphthaline can also be used. Benzene, toluene, xylene and isomeric mixtures of hexylcumene, cyclohexyltoluene, cyclohexylethylbenzene, isopropylethylbenzene, dihexylbenzenes, di-p-tolylmethane, and diphenyl, and other such compounds, are examples of suitable aromatic hydrocarbons. The following can be mentioned as ethers which are suitable for the performance of the reaction: diisopropyl ether, diisoamyl ether, dimethyl ethers of ethylene and diethylene glycol, diphenyl ether, 1,4-dioxane, etc.

This listing shows that not only aliphatic, but also aromatic, cyclic and open-chain ethers can be used. Polar solvents, such as nitrobenzene dimethylsulfoxide and dimethylformamide, can be used, too. Also suitable are such solvents as chlorinated aliphatic and aromatic hydrocarbons whose halogen atoms have poor mobility, examples being tetrachloromethane, tetrachloroethane, tetrachloroethylene, pentachloroethane, o-dichlorobenzene, trichlorobenzenes, β,β-dichloroethylbenzene, etc.

The crude products prepared according to the invention represent titanic ester halides with fractional indices. The separation of the mixtures can be performed by prior-art methods, although the crude products can also be used directly in known applications. Aside from these methods and applications, the crude products are transformed to tetraalkyl esters by known methods. Due to the higher replaceability of the halogen, the further reaction of the products is more easily managed if the yield of $NH_4Cl$ is low.

The following examples illustrate the process of the invention.

EXAMPLE 1

19.0 g. (0.1 mole) of titanium tetrachloride were dissolved in 250 ml. of dry cyclohexane in a three-necked flask equipped with stirrer, dropping funnel and reflux condenser. The reflux condenser was connected through an exhaust gas line to a gas washing bottle filled with NaOH so as to permit the HCl gas obtained to be determined. On the dropping funnel nipple there was provided a connection for dry nitrogen whose flow was measured with a rotameter.

37.0 g. (0.5 mole) of dry n-butanol was then added slowly, drop by drop, and the reaction mixture was gassed with nitrogen for 1 hour at the boiling point of the cyclohexane. This was followed by the addition of 2 mole percent (=0.23 g.) of N,N-dimethylcyclohexylamine. The release of hydrogen chloride resumed. The reaction mixture was heated at ebullition for another 3 to 4 hours, approximately, while gassing with nitrogen continued (30 l./h.). Thereafter the solvent and the unreacted alcohol were removed by distillation and the product obtained was analyzed. 30.0 g. of a liquid product were obtained.

*Analysis.*—$TiO_2$ 27%; Cl 15.95%. This corresponds to the following composition: $TiCl_{1.3}(OC_4H_9)_{2.7}$.

In a concurrent parallel experiment without the use of catalyst, the results were as follows: Yield 28.0 g.

*Analysis.*—$TiO_2$ 29.4%; Cl 23.8%. Product composition: $TiCl_{1.8}(OC_4H_9)_{2.2}$.

The same procedure as described yielded products of the following composition when other catalysts were used:

| Catalyst: | Compound obtained |
| --- | --- |
| a ___ 2-cyanopyridine | $TiCl_{1.44}(OC_4H_9)_{2.56}$ |
| b ___ Dimethylaminoacetonitrile | $TiCl_{1.47}(OC_4H_9)_{2.53}$ |
| c ___ Diisobutylaminoacetonitrile | $TiCl_{1.57}(OC_4H_9)_{2.43}$ |
| d ___ Di-n-butylaminoacetonitrile | $TiCl_{1.57}(OC_4H_9)_{2.43}$ |
| e ___ Tri-n-butylamine | $TiCl_{1.60}(OC_4H_9)_{2.40}$ |
| f ___ N-pyrrolidinoacetonitrile | $TiCl_{1.60}(OC_4H_9)_{2.40}$ |
| g ___ Di-(2-hydroxypropyl)-ethanolamine | $TiCl_{1.63}(OC_4H_9)_{2.37}$ |
| h ___ N-methylpyrrolidine | $TiCl_{1.63}(OC_4H_9)_{2.37}$ |
| i ___ N,N,N',N'-tetramethylbenzidine | $TiCl_{1.64}(OC_4H_9)_{2.35}$ |
| j ___ Morpholinoacetic acid morpholide | $TiCl_{1.64}(TC_4H_9)_{2.36}$ |
| k ___ Di-N-n-butylbenzoic acid amide | $TiCl_{1.65}(OC_4H_9)_{2.35}$ |
| l ___ N-β-hydroxyethylmorpholine | $TiCl_{1.73}(OC_4H_9)_{2.27}$ |
| m ___ N,N,N',N'',N''-hexamethylphosphoric acid triamide | $TiCl_{1.43}(OC_4H_9)_{2.57}$ |
| n ___ N,N,N',N'',N''-hexamethylphosphorous acid triamide | $TiCl_{1.50}(OC_4H_9)_{2.50}$ |
| o ___ p-Nitro-n,n-dimethylaniline | $TiCl_{1.29}(OC_4H_9)_{2.71}$ |
| p ___ p-(Dimethylamino)-benzoic acid nitrile | $TiCl_{1.35}(OC_4H_9)_{2.65}$ |
| q ___ N-methylaminoacetonitrile | $TiCl_{1.54}(OC_4H_9)_{2.45}$ |
| r ___ N-methylaminoacetonitrile hydrochloride | $TiCl_{1.33}(OC_4H_9)_{2.67}$ |
| s ___ Benzyldimethylamine | $TiCl_{1.45}(OC_4H_9)_{2.55}$ |
| t ___ Formamide | $TiCl_{1.19}(OC_4H_9)_{2.81}$ |
| u ___ Triethylamine | $TiCl_{1.47}(OC_4H_9)_{2.53}$ |
| v ___ N,N'-dimethylpiperazine | $TiCl_{1.49}(OC_4H_9)_{2.51}$ |
| w ___ Dimethylacetonamide | $TiCl_{1.53}(OC_4H_9)_{2.47}$ |
| x1-x7 ___ Succinimide, triallylamine, N-sulfinylaniline, N-amimidinosulfanilamide, N-2-pyridylsulfanilamide and 4-sulfanoylacetanilide resulted in the same product having the composition | $TiCl_{1.55}(OC_4H_9)_{2.45}$ |

These results do not represent the optimum results for the individual experiments.

EXAMPLE 2

19.0 g. of titanium tetrachloride was dissolved in 250 ml. of dry xylene, 37.0 g. of n-butanol was added drop by drop, and the rest of the procedure was as in Example 1. 2 mole percent (0.15 g.) of dimethylformamide was used as catalyst. Yield: 27 g.

*Analysis.*—$TiO_2$ 27%; Cl 11.6%. The product, on the basis of its analysis, has the following composition: $TiCl_{0.85}(OC_4H_9)_{3.15}$.

EXAMPLE 3

23.7 g. of titanium dichloride-di-n-propylate was dissolved in 250 ml. of xylene, 18.0 g. of n-propanol was added, and the rest of the procedure was the same as in Example 1. 2 mole percent (0.35 g.) of p-dimethylamino)-benzoic acid nitrile was used as the catalyst. 23 g. of a liquid product was obtained.

*Analysis.*—$TiO_2$ 31.0%; Cl 15.1%. On the basis of its analysis, the product has the following composition: $TiCl_{1.15}(OC_3H_7)_{2.85}$.

EXAMPLE 4

19.0 g. of titanium tetrachloride was dissolved in 250 ml. of dry xylene, 37.0 g. of n-butanol was added drop by drop, and the rest of the procedure was the same as in Example 1, except that after the addition of 2 mole percent (0.1 g.) of catalyst—formamide in this case—the mixture was heated for 12 hours at ebullition, with nitrogen gassing and refluxing. A product was obtained which had the precise stoichiometric composition:

$$TiCl(OC_4H_9)_3$$

*Analysis*: Found (percent): $TiO_2$, 26.4; Cl, 11.7. Theoretical (percent): $TiO_2$, 26.4; Cl, 11.73.

EXAMPLE 5

In the manner described in Example 1, 19 grams (0.1 mole) of titanium tetrachloride was reacted with 52.1 g. (0.4 mole) of 2-ethylhexyl alcohol, in 250 ml. of xylene. After 60 minutes, 0.1 g. of formamide was added as catalyst, and the mixture was heated at ebullition for another 180 minutes. This was followed by distillation as in Example 1. The liquid product obtained corresponded approximately to the formula $Ti(OC_8H_{17})_4$ and contained very small residual amounts of chlorine. It was found that approximately 65 mole percent of hydrochloric acid had been released by the reaction without catalyst. After the addition of the catalyst, the amount of hyrochloric acid released was increased to better than 99 mole percent.

EXAMPLE 6

In the same procedure as in Example 1, 19 g. (0.1 mole) of titanium tetrachloride was dissolved in 250 ml. of xylene, and reacted with 43.3 grams (0.4 mole) of cresol. The first stage lasted for 60 minutes. After the addition of 0.25 g. of p-nitro-N,N-imethylaniline as catalyst, the mixture was heated at ebullition for an additional 150 minutes.

Tetracresyl titanate was isolated as the end product, and it contained only traces of chlorine. Prior to the addition of the catalyst 86 mole percent of HCl had been released. In the second stage, the percentage rose to approximately 100 mole percent.

EXAMPLE 7

Pursuant to Example 1, 19 g. (0.1 mole) of titanium tetrachloride in 250 ml. of xylene was reacted with 43.3 g. (0.4 mole) of benzyl alcohol. The duration of the first stage was 60 minutes. In the second stage, 0.2 g. of N-methylaminoacetonitrile hydrochloride was added as the catalyst and the mixture was heated again for 3 hours at ebullition. Dichlorodibenzyl titanate was obtained as the final product. 34 mole percent of HCl had been yielded after the first stage, and about 50 mole percent after the second.

What is claimed is:

1. In the process for converting titanium halides to titanate esters by the reaction of said titanium halides with at least one organic compound having at least one reactive hydroxyl group thereon selected from the group consisting of methanol, ethanol, n-propanol, isopropanol, allyl alcohol, butanol, hexanol, 2-ethyl hexanol, benzylalcohol, cinnamic alcohol, cyclopentanol, cyclohexanol, cyclododecanol, ethylene glycol, diethylene glycol, butanediol - (1,4), hexane diol - (1,6), ethylene glycol monomethyl ether, diethylene glycol monomethylether, triethylene glycol mono-n-butyl ether, alkyl lactates, ethylene glycol monopropionate, 2-chloropropanol, 2,3 - dichloropropanol, 2,3 - dibromopropanol, acetylacetone, levulinic acid esters, phenol and cresol; the improvement which comprises carrying out said reaction at about 50 to 250° C. in the liquid phase in contact with at least one catalyst selected from the group consisting of tertiary amines, amides, and N-substituted amides wherein said catalyst is present in a proportion of about 0.01 to 20 mole percent based on said titanium halide.

2. The improved process claimed in claim 1, carried out at about 50 to 200° C.

3. The improved process claimed in claim 1, wherein said catalyst is present in a proportion of about 0.2 to 2 mole percent.

4. The improved process claimed in claim 1, wherein said titanium halide is a titanium tetra halide.

5. The improved process claimed in claim 1, wherein said catalyst is a quaternary ammonium compound.

6. The improved process claimed in claim 5, wherein said catalyst is a hydrochloride.

7. The improved process claimed in claim 1, wherein said amide is a carbodiimide.

8. The improved process claimed in claim 1, wherein said tertiary amine is an aromatic tertiary amine.

9. The improved process claimed in claim 8, wherein said tertiary amine is pyridine.

10. The improved process claimed in claim 1, wherein said tertiary amine has aliphatic and aromatic moieties.

11. The improved process claimed in claim 1, carried out with an inert liquid reaction medium.

12. The improved process claimed in claim 1, carried out in the fused state.

13. The improved process claimed in claim 1, carried out in solution.

14. The improved process claimed in claim 11, wherein said reaction medium is at least one member selected from the group consisting of isooctane, benzine fractions boiling between about 120 and 200° C., benzene, toluene, xylene, hexylcumene, cyclohexyltoluene, cyclohexyl ethyl benzene, isopropylethyl benzene, dihexyl benzene, di-p-tolyl methane, diphenyl, diisopropyl ether, diisoamyl ether, dimethoxy ethylene, diethylene glycol, diphenyl ether, 1,4 dioxane, nitrobenzene, dimethyl sulfoxide, dimethyl formamide, tetrachloromethane, tetrachloroethane, tetrachloroethylene, pentachloroethane, o-dichloro-benzene, trichlorobenzene, and $\beta\beta$ dichloroethyl benzene.

15. The improved process claimed in claim 1, wherein said titanium halide is at least one member selected from the group consisting of titanium tetrachloride, titanium tetrabromide, titanium trichloro-n-butyl ester, and titanium dichloro-di-n-butyl ester.

16. The improved process claimed in claim 1, wherein said catalyst is at least one member selected from the group consisting of trimethylamine, triethylamine, triisopropylamine, triallyl amine, triisobutyl amine, monoethyl - diisopropyl amine, monoethyl-di-n-butyl amine, tri-n-butyl amine, N,N,N',N'-tetramethyl butane diamine-(1,4), N,N,N',N'-tetramethylethylene diamine, β-chloropropyl-propyl diamine, tris-(β-ethoxy - ethyl) amine, N,N-dimethyl amino acetonitrile, N-methyl-amino acetonitrile, methylene aminoacetonitrile, N,N-di-n-butyl amino acetonitrile, N,N diisobutyl amino propionitrile, N,N-diisopropyl amino acetonitrile, N-n-butyl-N-methyl amino acetonitrile, N,N-dimethyl-β-amino propionitrile, dimethyl-p-amino benzonitrile, N,N-dimethyl cyclohexylamine, N,N-dimethylaniline, N,N-diethylaniline, p-bromophenyl dimethylamine, 2,4, dinitrophenyl dimethyl amine, benzyl-dimethylamine, p-nitrophenyl-di-n-butylamine, 2,4-dichlorophenyl diethylamine, N,N,N',N'-tetramethylbenzidine, N-n-butylmorpholine, N-phenyl morpholine, N-(4-methylphenyl)-morpholine, morpholine acetic acid morpholide, N,N-di-methyl piperazine, N,N-di-n-butylpiperazine, N,N-diphenyl piperazine, N-n-propyl tetrahydroquinoline, N-phenyl tetrahydroisoquinoline, N-methyl-pyrrolidine, pyridine, quinoline, isoquinoline, pyrazine, oxazine, quinozoline, oxazole, thiazole, oxadiazole, benzothiazole, formamide, methyl formamide, dimethyl formamide, acetamide, N,N - dimethyl acetamide, N,N-di - n - propylbutyramide, N,N - di - isopropylbutyramide, N,N-di-n-butylbutyramide, N,N - di-isobutylbutyramide, N-benzyl butyramide, N,N-dipropyl-2-ethyl hexamide, N,N-di-n-butyl acetoacetamide, acetoacetic acid anilide, benzyl benzoamide, N,N-dimethyl benzo amide, N,N'-diformylhexamethylene diamine N,N - dimethyl succinamide, N,N - dimethyl maleimide, dimethyl barbituric acid, diethyl barbituric acid, di-n-butyl-barbituric acid, phenyl barbituric acid, N-phenyl urethane, diphenyl carbon diimide, diphenyl - guanidine, 4 - sulfamoylacetaniline, N-amido-sulfanilamide, N-2-pyridylsulfanilamide, N,N,N,N',N',N'-hexamethyl phosphoric acid triamide, N,N,N,N',N',N'-hexamethyl phosphorous acid triamide, N,N,N,N',N',N'-hexa-n-butyl phosphorous acetic acid triamide, N,N,N,N',N',N' - hexa - isobutyl phosphorous acetic acid triamide, phosphorous acid trimorphalide, di-n-propoxy titanium diamide, di-n-butyl tin diamide, di-isobutyl tin diamide, pyridine, hydrochloride, trimethylbenzyl ammonium chloride, triethyl benzyl-ammonium hydroxide, triethyl benzyl ammonium acetate, and triethyl ammonium chloride.

References Cited

UNITED STATES PATENTS

| | | | |
|---|---|---|---|
| 2,114,866 | 4/1938 | Vaughn | 260—429.5 U |
| 2,187,821 | 1/1940 | Nelles | 260—429.5 |
| 2,621,194 | 12/1952 | Balthis | 260—429.5 X |
| 2,654,770 | 10/1953 | Herman | 260—429.5 |

OTHER REFERENCES

Feld et al.: The Organic Chemistry of Titanium, Butterworths, Washington, D.C., pp. 19 to 21 (1965).

TOBIAS E. LEVOW, Primary Examiner

H. M. S. SNEED, Assistant Examiner